United States Patent
Brown et al.

(10) Patent No.: US 7,104,350 B2
(45) Date of Patent: Sep. 12, 2006

(54) LARGE VEHICLE HOOD OR TRUNK LID BODYSHELL ELEMENT

(75) Inventors: Garry Brown, Nuneaton (GB); Thomas Frank, Stuttgart (DE); Klaus Rathje, Hildrizhausen (DE); Oliver Tomlin, Leicestershire (GB); Maya Ziegs, Ammerbuch (DE)

(73) Assignee: DaimlerChrysler AG, Stuttgart (DE)

( * ) Notice: Subject to any disclaimer, the term of this patent is extended or adjusted under 35 U.S.C. 154(b) by 210 days.

(21) Appl. No.: 10/265,191

(22) Filed: Oct. 7, 2002

(65) Prior Publication Data

US 2003/0098192 A1 May 29, 2003

(30) Foreign Application Priority Data

Oct. 5, 2001 (DE) .......................... 101 49 116

(51) Int. Cl.
*B62D 25/10* (2006.01)
*B60J 7/00* (2006.01)

(52) U.S. Cl. ................ 180/69.2; 180/69.21; 180/69.22; 296/187.04; 296/76

(58) Field of Classification Search ................ 180/69.2, 180/69.21, 69.22, 69.23, 69.24, 69.25; 280/784, 280/785; 296/76, 187.04, 193.11, 191
See application file for complete search history.

(56) References Cited

U.S. PATENT DOCUMENTS 4,359,120 A * 11/1982 Schmidt et al. ........ 296/187.04
5,149,169 A * 9/1992 Nozaki ........................ 296/206
5,605,371 A * 2/1997 Borchelt et al. ........ 296/187.09
5,934,743 A * 8/1999 Nohr et al. ............. 296/187.06
6,145,915 A * 11/2000 Queveau et al. ....... 296/107.08
6,220,653 B1   4/2001 Welsch et al.
6,375,251 B1 * 4/2002 Taghaddos ............. 296/187.03
6,386,623 B1 * 5/2002 Ryan et al. ............ 296/187.04
6,641,209 B1 * 11/2003 Warwel et al. ............. 180/69.2
6,672,655 B1 * 1/2004 Zinsmeister et al. ........ 296/210
6,676,197 B1 * 1/2004 Ozawa ................... 296/187.03
6,755,459 B1 * 6/2004 Thelen et al. .......... 296/187.04

FOREIGN PATENT DOCUMENTS

| DE | 2558332 A1 | 7/1977 |
| DE | 7822020 U1 | 11/1978 |
| DE | 2934430 | 3/1981 |
| DE | 3546050 A1 | 7/1987 |
| DE | 19929048 A1 | 12/1999 |
| DE | 19902311 A1 | 7/2000 |
| EP | 1000821 A2 | 5/2000 |
| JP | 08310450 A | 11/1996 |
| JP | 11198861 A | 7/1999 |
| JP | 11-321714 | 11/1999 |

OTHER PUBLICATIONS

Search Report Mailed Dec. 17, 2003.

* cited by examiner

*Primary Examiner*—Christopher P. Ellis
*Assistant Examiner*—Gerald B. Klebe
(74) *Attorney, Agent, or Firm*—Crowell & Moring LLP

(57) ABSTRACT

In order to protect pedestrians in the event of a collision with a motor vehicle, a bodyshell element forming a hood or trunk lid has at least one edge area with an outer part isolated from a support structure, in such a way that the outer part creates an energy-absorbing zone in front of the support structure part as a means of protection in a collision.

7 Claims, 2 Drawing Sheets

LARGE VEHICLE HOOD OR TRUNK LID BODYSHELL ELEMENT

BACKGROUND AND SUMMARY OF THE INVENTION

This application claims the priority of Application No. 101 49 116.6-21 filed in Germany on Oct. 5, 2001, the disclosure of which is expressly incorporated by reference herein.

The invention relates to a large, extensive bodyshell element, in particular an engine hood or front-opening trunk lid of a motor vehicle, having a thin-walled and non-rigid outer part and inner reinforcing structure, which has a support structure arranged at the edge of the bodyshell element or which is designed as such.

Such a bodyshell element is represented in German Patent Document No. DE 25 58 332 A1. This essentially comprises a comparatively gently arched outer panel, which is connected at the edge to an inner peripheral frame, the frame parts of which are designed as carriers having a cap-shaped profile. In this case the inside of the outer panel is materially fused to the flanges of the cap-shaped profile, so that between its flanges the middle area of the cap-shaped profile forms a closed tubular profile with that part of the outer panel overlapping the said area. In addition, at the edges of the bodyshell part the outer panel is turned over in a U-shape around the edge flange of the cap-shaped profile, so that the aforementioned flange is correspondingly reinforced and a positively interlocking connection is also created between the outer panel and the inner frame. In order to be able to ensure a weight-saving design of the bodyshell part on the one hand, and sufficient flexural rigidity of the middle area of the bodyshell part on the other, the outer panel is reinforced on the inside by a flat element. This may take the form of a grid made from wire or by punching a metal part and may be bonded to the outer panel.

German Patent Document No. DE 199 29 048 A1 discloses a similar bodyshell element, which is designed as an engine hood of a motor vehicle. Here again a thin-walled outer panel, the upper side of which forms a surface of the bodyshell, is connected to a frame-like inner panel, the outer edge contour of which very largely matches the outer edge contour of the outer panel, so that the outer panel and inner panel can be connected together by flanging and/or spot welding or continuous welding. A foam part, which serves to damp vibrations of the outer panel and preferably bears all over against the inside of the outer panel and accordingly conforms to the arching of the outer panel, is arranged inside the frame opening of the inner panel. This permits a damping of bodyshell noises and means that the bodyshell element can be designed to yield on impact.

German Patent Document No. DE 35 46 050 A1 (corresponding U.S. Pat. No. 4,950,522) discloses a shock-absorbing bodyshell outer part for motor vehicles in the form of a plastic component. In this case the bodyshell part takes the form of a thin-walled plastic component, the gap between the two walls being filled by a core of paper members, honeycomb structures or rigid foam. With the exception of predefined breaking areas, the core is fixed to the walls of the bodyshell part, for example by bonding.

According to European Patent Document No. EP 1 000 821 A2 (corresponding U.S. Pat. No. 5,706,908), a front-opening or bodyshell hood of a motor vehicle may be designed as a composite component, which essentially comprises an inner hood carrier in the form of a profiled plate, an intermediate layer arranged on the outside thereof and a cover panel arranged on top of the latter and forming the outside of the bodyshell part, an edge area of the hood part being formed by a separate, soft nose part. This is intended to create a hood that overall is designed to yield on impact.

Although these known bodyshell parts, at least in some areas, have a greater pliability as is desirable in order to prevent injuries to pedestrians in collisions with motor vehicles, the bodyshell parts described above are still not ideal, because the support structure still entails a considerable risk of injury for pedestrians and/or the necessary cost of manufacturing the bodyshell parts is too high.

An object of the invention, therefore, is to create bodyshell parts that yield on impact and which, on the one hand, can be manufactured in the conventional way as sheet metal parts, and on the other are also pliable, at least in some edge areas of the bodyshell part.

According to the invention this object is achieved in bodyshell parts of the aforementioned type in that on at least one edge area of the bodyshell element the support structure is offset inwards and/or downwards and separated by a distance from the adjoining edge of the bodyshell part and the outer part.

The invention is based on the general idea of ensuring that edge zones of the bodyshell part yield on impact by providing, on the one hand, an edge structure designed for optimum deformation in the event of impact with a human head, and on the other a support structure isolated therefrom in order to ensure the rigidity of the bodyshell part.

In particular, it is proposed, according to a preferred embodiment, that in the area of an edge deformation area of the bodyshell part the outer part be designed as a U or V-shaped profile open towards the inside of the bodyshell part, one leg of which profile is designed as part of the outside of the bodyshell and the other leg of which is designed as connection to the frame-like support structure. A beaded flange projecting beyond the support frame towards the edge of the bodyshell part is thereby created, together with a gap inside the beaded flange between support frame part and the outside of the bodyshell, so that the outer part can yield on the one hand perpendicular to the outer surface in the direction of the support structure and on the other also in tangential directions to the outside of the bodyshell and/or rearwards in the longitudinal direction of the vehicle.

It is furthermore advantageous according to certain preferred embodiments of the invention for a hand, grasping around the edge of the bodyshell part, to be able to reach under the aforementioned beaded flange at its leg adjoining the support frame without risk of deformation, in order, for example, to open a hood or trunk lid formed by the bodyshell part.

As desired, according to certain preferred embodiments of the invention the load-bearing capacity of the transitional area between the inner leg of the U or V-shaped profile and the support structure can be enhanced without limiting the deformability of the beaded flange formed by the inner U or V-shaped profile, in that together with the adjoining support structure the inner U or V-shaped leg forms an obtuse-angled V-shaped profile with V-opening facing the other leg.

With regard to preferred features of the invention, reference is moreover made to the claims and to the following explanation of the drawing, with reference to which an especially preferred embodiment of the invention is explained in more detail.

Other objects, advantages and novel features of the present invention will become apparent from the following detailed description of the invention when considered in conjunction with the accompanying drawings.

DETAILED DESCRIPTION OF THE DRAWINGS

Figure 2:
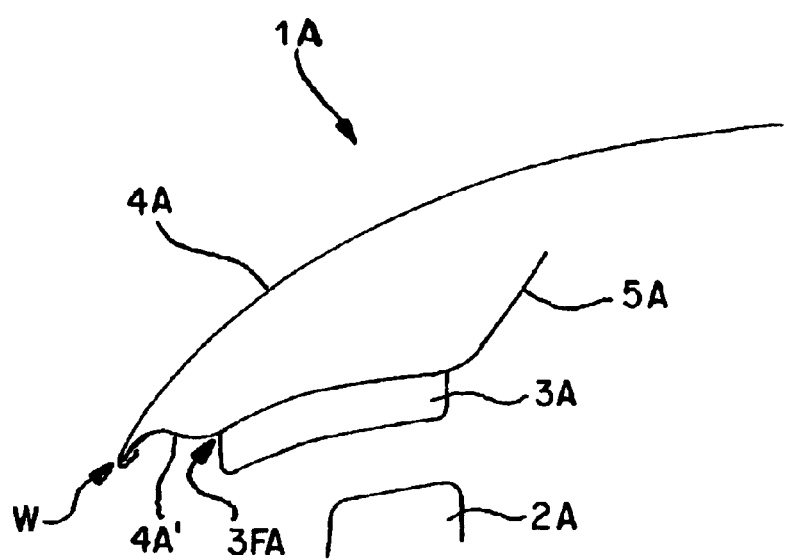
FIG. 2 is a schematic sectional view showing a vehicle front area constructed according to a second preferred embodiment of the invention.
Figure 3:
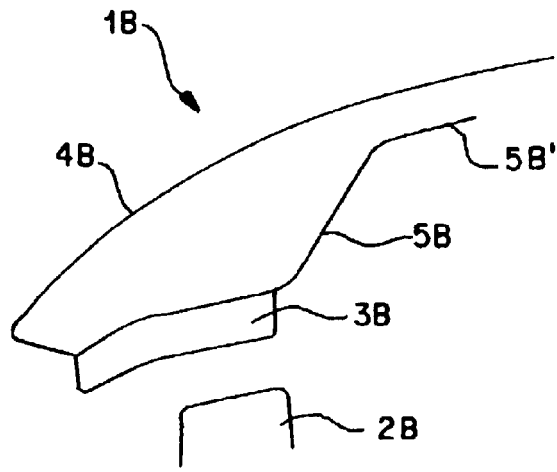
FIG. 3 is a schematic sectional view showing a vehicle front area constructed according to a third preferred embodiment of the invention.
Figure 4:
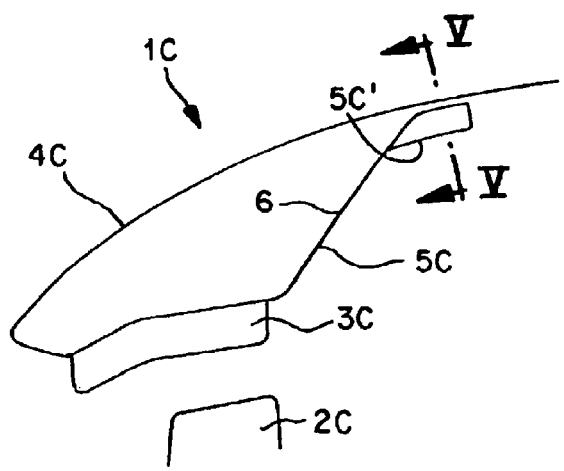
FIG. 4 is a schematic sectional view showing a vehicle front area constructed according to a fourth preferred embodiment of the invention.
Figure 5:
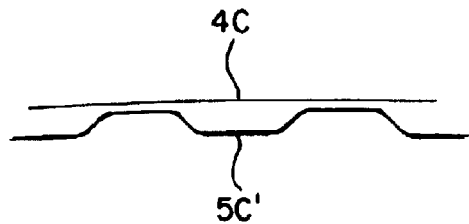
FIG. 5 is a schematic sectional view taken along V—V of FIG. 4.

FIGS. 1 to 4 show diagrammatic sections through the front area of a front-opening hood or trunk lid part according to the invention and FIG. 5 shows a section along the line of section V—V in FIG. 4.

Figure 1:
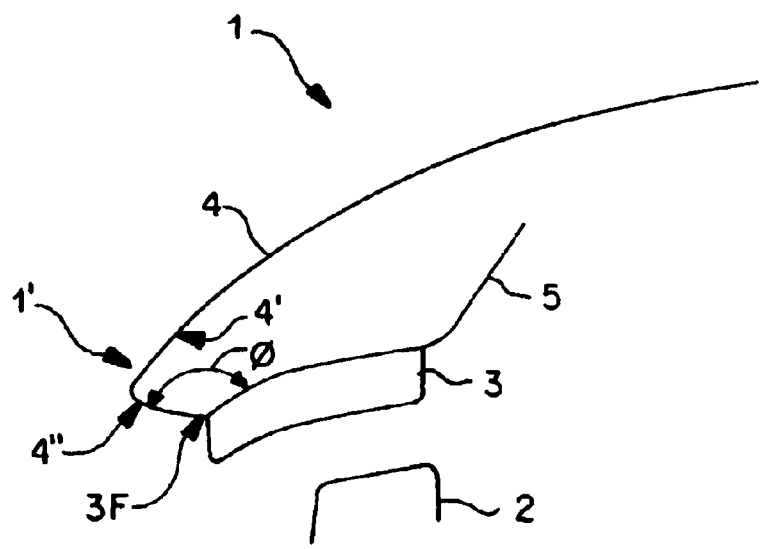
FIG. 1 is a schematic sectional view showing a vehicle front area constructed according to a first preferred embodiment of the invention.

According to FIG. 1 the front part of a front-opening part in the form of hood or trunk lid 1 may be supported, in a fundamentally known manner and if necessary with the insertion of springs (not shown), on a frame part 2 of the bodyshell of a passenger car, likewise not shown.

A hood or trunk lid side support structure part 3, in the form of a frame cross-member, for example, which is isolated from an outer part 4 forming the outside of the front opening part or from a panelling forming the outer part, is provided as hood or trunk lid side support part. For this purpose the outer part 4, which in conventional bodyshell systems is made from sheet metal, has a U-shaped or possibly also V-shaped cross section in the area of the front edge of the front-opening 1, so that a beaded flange 1' is formed clearly projecting forwards beyond the front edge 3F of support structure part 3, one leg 4' of the beaded flange 1' forming the outside or upper side of the front-opening part 1 and the other leg 4" adjoining or being firmly connected to the support structure part 3.

The U or V-shaped profile is open towards the inside of the front-opening bonnet 1 or in the rearward direction of the vehicle, that is to say the U or V-shaped profile forms a unilaterally opening "half-tube" with the support structure part 3 adjoining the lower leg.

The lower leg 4" of the U or V-shaped profile together with the adjoining area of the support structure part 3 forms a channel with an obtuse-angled U-shaped profile open at the top (angle ø). This increases the rigidity of the bond between the two parts, particularly in the case of an arched support structure part 3. This makes it possible for a hand to grip under the lower leg 4" in order to open the bonnet 1 without any risk of deformation.

As desired, a pliable support part or panel 5, the free edge of which is directed obliquely upwards but is separated from the outer part 4 extended over the former, may also be arranged at the edge of the support structure part 3 pointing in the rearward direction of the vehicle.

Should a pedestrian in a road accident collide with or land on the front-opening part (hood or trunk lid) 1, the outer part 4 subject to energy-absorbing bending deformation is capable of yielding rearwards and downwards in the longitudinal direction of the vehicle without the pedestrian colliding with the support structure part 3.

With correspondingly greater bending of the outer part 4, this is supported on the bendable support part or panel 5, thereby lending a desired progressive character to the deformation resistance of the outer part 4.

Provision may also be made here to fill or spray at least part of the space between the outer part 4 and the upper side of the support structure part 3 or the support part or panel 5 with a compressible foam or the like.

The support part 3 can basically take any form such as a sheet metal profiled part or extruded profile, for example.

In the embodiment of FIG. 2, similar parts as described in connection with FIG. 1 include similar reference numbers with a suffix A. Unless otherwise noted these parts function as described in conjunction with FIG. 1.

The embodiment in FIG. 2 differs from the embodiment in FIG. 1 mainly in that the outer part 4A is connected by way of a welt W to a connecting sheet metal part 4A' joining the outer part 4A to the support structure part 3A, said connecting part 4A' having an essentially S-shaped cross section, such that the outer part 4A and the connecting sheet metal part 4A' together form a hollow beaded flange projecting beyond the left-hand edge 3FA of the structure part 3A in FIG. 2. The front area of the front-opening hood or trunk lid 1A can thereby again yield rearwards and downwards. The welt plane preferably runs approximately transversely to the direction of impact anticipated in the event of the vehicle colliding with pedestrians.

In the embodiment of FIG. 3, similar parts as described in connection with FIG. 1 include similar reference numbers with a suffix B. Unless otherwise noted these parts function as described in conjunction with FIG. 1.

The embodiment in FIG. 3 shows that the support part or panel 5B may have an extension 5B' essentially parallel to the outer part 4B, the extension acting as support surface in the event of a downward deformation of the outer part 4B and, by virtue of its vertical separation from the outer part, serving as an additional energy-absorbing, bendable cushioning surface only after a predefined initial deformation of the outer part 4B.

In the embodiment of FIG. 4, similar parts as described in connection with FIG. 1 include similar reference numbers with a suffix C. Unless otherwise noted these parts function as described in conjunction with FIG. 1.

FIG. 4 shows an example of how the support part or panel 5C may be provided with openings 6 in the area of an especially flexurally yielding zone, in order to reduce the rigidity of the panel 5C in the bending zone or bending zones.

The section in FIG. 5 shows that the support surface section 5C' may have a corrugated shape, in such a way that some areas of this section extend closely adjacent to the outer part 4C and some areas extend further away from the outer part 4C.

The outer parts 4, 4A, 4B, 4C and the support structure parts 3A, 3B, 3C may be composed of the same or different materials, such as steel and/or aluminium.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An engine hood or front-opening trunk lid of a motor vehicle, comprising:
   a thin-walled and non-rigid outer part, and
   a support structure part interconnected with the thin-walled and non-rigid outer part,
   wherein the thin-walled and non-rigid outer part defines a flange having a U or V-shaped profile projecting beyond a front edge of the support structure part so that the support structure part is offset inwards and separated by a distance from the flange and the outer parts,
   wherein a lower leg of the flange profile adjoins and is firmly and directly connected to the support structure part, and
   wherein, together with the support structure part, the lower leg forms an obtuse-angled V-shaped profile open at the top.

2. The engine hood or front-opening trunk lid according to claim 1, wherein an energy-absorbing, deformable support part or panel, on which the thin-walled and non-rigid outer part under corresponding deformation comes to bear, is arranged on the support structure part.

3. The engine hood or front-opening trunk lid according to claim 1, wherein in at least some areas the support structure part has a closed tubular profile.

4. The engine hood or front-opening trunk lid according to claim 3, wherein an energy-absorbing, deformable support part or panel, on which the thin-walled and non-rigid outer part under corresponding deformation comes to bear, is arranged on the support structure part.

5. The engine hood or front-opening trunk lid according to claim 1, wherein the profile defines a bend with a small radius of curvature between said lower leg and an upper leg thereof.

6. The engine hood or front-opening trunk lid according to claim 5, wherein in at least some areas the support structure part has a closed tubular profile.

7. The engine hood or front-opening trunk lid according to claim 5, wherein an energy-absorbing, deformable support part or panel, on which the thin-walled and non-rigid outer part under corresponding deformation comes to bear, is arranged on the support structure part.

* * * * *